United States Patent [19]

Kato et al.

[11] Patent Number: 4,591,672

[45] Date of Patent: May 27, 1986

[54] LOUD SPEAKER ASSEMBLY

[75] Inventors: Hiroshi Kato; Hitoshi Nakada, both of Saitama; Isao Nishiwaki, Tokyo; Toshio Teramoto, Tokyo; Keikichi Yagii, Tokyo; Masahiro Niinomi, Tokyo, all of Japan

[73] Assignees: Pioneer Electronic Corporation; Japan Synthetic Rubber Co., Ltd., both of Tokyo, Japan

[21] Appl. No.: 645,706

[22] Filed: Aug. 30, 1984

[30] Foreign Application Priority Data

Aug. 31, 1983 [JP] Japan ................................ 58-161092

[51] Int. Cl.$^4$ ................................................ H04R 9/02
[52] U.S. Cl. .................... 179/115.5 VC; 179/115.5 R; 29/594
[58] Field of Search ............... 525/286, 301, 303, 310; 156/330.9, 331.1, 331.8; 179/115.5 R, 115.5 VC

[56] References Cited

U.S. PATENT DOCUMENTS 4,102,945  7/1978  Gleave .......................... 156/331.1
4,126,504  11/1978  Wolinski ........................ 525/301

Primary Examiner—Paul R. Michl

Attorney, Agent, or Firm—Fleit, Jacobson, Cohn & Price

[57] ABSTRACT

A loud speaker assembly including members which are bonded together with an adhesive compound, wherein the adhesive compound comprises at least one composition selected from the group consisting of alkyl acrylate, alkyl methacrylate, acrylic acid and methacrylic acid; a copolymerized elastomer including at least 5 percent by weight of a functional monomer, an unsaturated nitrile and at least one of butadiene and isoprene; and an organic peroxide. In such a loud speaker assembly, the adhesive compound may be used to provide connection between the cone housing and the edge member, between the one housing and the baffle gasket and, between the cone housing and each of the edge member and the baffle gasket, between the vibrator cone and the voice coil unit, between the voice coil unit and the damper or spider element, between the vibrator cone and the voice coil unit, between the voice coil unit and an electric lead wire connected to the voice coil unit, between the vibrator cone and a center cap member, between the field magnet and the magnet support member, and/or between the field magnet and the polepiece plate of the speaker assembly.

69 Claims, 2 Drawing Figures

LOUD SPEAKER ASSEMBLY

FIELD OF THE INVENTION

The present invention relates to a loud speaker assembly and, more particularly, to a loud speaker assembly including members and elements held together with an acrylic adhesive compound of the two-part mixed type.

BACKGROUND OF THE INVENTION

A loud speaker of, for example, the dynamic cone type is an electromechanical acoustic system which is largely composed of a field magnet, a yoke or field magnet support, a pole-piece plate, a cone or vibrator element, a cone housing, a voice coil unit, an edge or annulus member, a baffle gasket and a damper or spider as is well known in the art. The field magnet, field magnet support and pole-piece plate constitute a magnetic circuit structure of the loud speaker, while the vibrator cone, cone housing, voice coil unit, edge member, baffle gasket and spider constitute an electromagnetic acoustic structure of the speaker. The field magnet support or yoke member is attached to the field magnet and has a pole-piece portion forming an annular air gap surrounded by the pole-piece plate attached to the field magnet. The voice coil unit, connected to the vibrator cone, axially projects into this annular air gap. These component members of the loud speaker are all bonded together with use of adhesives.

Rubber-based adhesive compounds are ordinarily used for the assemblage of these component members and elements for their relatively low prices and their relatively broad adaptability to materials. Problems are however encountered in using such adhesive compounds. One of these problems results from the use of a solvent which is contained in such a prior-art adhesive compound in a relatively high concentration. The solvent contained in or used with the adhesive compound tends to form a source for environmental contamination and, in addition, requires a disproportionately large amount of time for the evaporation of the solvent until the adhesive compound is completely set between the surfaces to be coupled together. The large amount of time consumed for the evaporation of the solvent results in low production efficiency of loud speakers. Where, furthermore, loud speakers are to be inspected upon completion of the assemblage by bonding, it is important that the inspection be performed after the adhesives used are sufficiently set. If the completed assembly of a speaker is put into operation for inspection purposes before the component members bonded together with adhesives are sufficiently set, not only the dimensions and performance characteristics of the speaker as determined by the inspection would not be reliable but the members once bonded together might be displaced with respect to each other and might cause crucial degradation of the performance quality of the speaker.

In the meantime, a rubber-based adhesive usually consists of 60 to 80 percent by weight of solvent and 20 to 40 percent by weight of solid constituents as well known in the art. The solvent evaporates while the adhesive applied to the surface of a member to be bonded is being set. The coating of the adhesive on the surface of the member is thus caused to shrink during setting of the adhesive. If the solvent in the adhesive fails to be evaporated uniformly on the surface of the member and/or the solid constituents have failed to mix with the solvent sufficiently, the coating of the adhesive set on the surface will have uneven thickness distribution over the surface. If such uneven thickness distribution of an adhesive takes place between the edge member and baffle gasket or between the edge member and the cone housing of a loud speaker, the speaker would produce buzzing sounds and/or the vibrator cone cantilevered by the edge member might be caused to dislodge from its proper concentric position with respect to the edge member and the voice coil unit.

With a view to avoiding these inconveniences resulting from the use of a rubber-based adhesive compound, it has been proposed to use an adhesive compound of the rapid setting type such as an acrylic adhesive compound for the bonding of the members to constitute a loud speaker. Problems have however been still encountered by the use of such an adhesive compound for the assemblage of a loud speaker. These problems include the lack of adaptability of an acrylic adhesive compound to oil-stained surfaces of metallic components such as the field magnet and the magnet support of a loud speaker. Another problem is the selectivity of an acrylic adhesive compound to the natures of the materials to be bonded. Where the cone housing, edge member and baffle gasket of a loud speaker are constructed of different materials, adhesive compounds of different chemical compositions must be used selectively one for the bonding of the cone housing and the edge member and one for the bonding of the edge member and the baffle gasket. Where, furthermore, the edge members of different materials are used depending upon the configurations and/or the materials of the vibrator cones of loud speakers of different types, adhesive compounds of different chemical compositions must also be used selectively for the bonding of the edge members and vibrator cones to the associated members and elements. In these two cases, it is thus required to use different adhesive compounds depending upon the combinations and locations of the members to be bonded together. The selective use of several kinds of adhesive compounds for the assemblage of a loud speaker not only results in increases in the time, labor and cost of production but requires strict control for the selection of the adhesives during assemblage of the loud speaker. Another objectionable property of an acrylic adhesive compound is its lack of affinity to air. By reason of this property, an acrylic adhesive compound tends to fail to set on an air-permeable material such as paper and for this reason can not be used for the bonding of a baffle gasket of paper.

A prime object of the present invention is to provide a novel acrylic adhesive compound eliminating all of the above described drawbacks of known acrylic adhesives.

SUMMARY OF THE INVENTION

In accordance with the present invention, there is provided a loud speaker assembly including members which are bonded together with an adhesive compound, wherein the adhesive compound comprises (a) at least one composition selected from the group consisting of alkyl acrylate, alkyl methacrylate, acrylic acid and methacrylic acid; (b) a copolymerized elastomer including at least 5 percent by weight of a functional monomer, an unsaturated nitrile and at least one of butadiene and isoprene; and (c) an organic peroxide. In a loud speaker assembly according to the present invention, the adhesive compound is used to provide connection between the cone housing and the edge member, between the cone housing and the baffle gasket and, between the cone housing and each of the edge member and the baffle gasket, between the vibrator cone and the voice coil unit, between the voice coil unit and the damper or spider element, between the vibrator cone and the voice coil unit, between the voice coil unit and an electric lead wire connected to the voice coil unit, between the vibrator cone and a center cap member, between the field magnet and the magnet support member, and/or between the field magnet and the pole-piece plate of the loud speaker assembly.

DETAILED DESCRIPTION OF THE INVENTION

The alkyl acrylate which may be used as the composition (a) of the adhesive compound used in a loud speaker assembly according to the present invention is preferably methyl acrylate, ethyl acrylate, propyl acrylate, butyl acrylate, isobutyl acrylate, tertiary butyl acrylate, or octyl acrylate and is more preferably any alkyl acrylate the number of carbons of which is from 1 to 4. Where alkyl methacrylate is preferred as the component (a), the alkyl methacrylate is preferably methyl methacrylate, ethyl metacrylate, propyl methacrylate, butyl methacrylate, isobutyl methacrylate, tertiary butyl methacrylate, or octyl methacrylate and is more preferably any alkyl methacrylate the number of carbons of which is from 1 to 4. The component (a) is contained in the adhesive compound preferably in a proportion more than 20 percent by weight or, more preferably, more than 40 percent by weight to the total quantity of the compositions containing unsaturated bonds in the adhesive compound.

On the other hand, the unsaturated nitrile to be used as a component of the composition (b) of the adhesive compound used in a loud speaker assembly according to the present invention is preferably acrylic nitrile or methacrylic nitrile. The functional monomer to be com-polymerized with such an unsaturated nitrile and at least one of butadiene and isoprene is one or any combination of two or more of (1) an acrylate or a methacrylate having an epoxy radical such as for example glycidyl acrylate or glycidyl methacrylate; (2) a hydroxyalkylacrylate or a hydroxyalkylmethacrylate selected from the group consisting of hydroxyethyl acrylate, hydroxypropyl acrylate, hydroxyethyl methacrylate, and hydroxypropyl methacrylate; (3) a dialkylaminoalkyl acrylate or a dialkylaminoalkyl methacrylate selected from the group consisting of dimethylaminoethyle acrylate, diethylaminoethyle acrylate, dimethylaminoethyle methacrylate, and diethylaminoethyle methacrylate; (4) an unsaturated acid such as an acrylic acid or a methacrylic acid; (5) an unsaturated amide such as acrylic amide or methacrylic amide; and (6) a polar vinyl monomer selected from the group consisting of vinyl acetate, ethyl vinyl ether, vinyl chloride, vinylidene chloride and methacrylonitrile. Particularly preferred of these is the acrilate or the methacrylate having an epoxy radical; the hydroxyalkylacrylate or the hydroxyalkylmethacrylate; or the dialkylaminoalkyl methacrylate dialkylaminoalkyl acrylate. The component (b) is contained in the adhesive compound preferably in a proportion within the range of 1 percent by weight to 40 percent by weight to the total quantity of the adhesive compound.

The copolymerized elastomer containing any one or more of these as the functional monomer can be prepared readily by a known emulsion polymerization process. For this purpose, an ordinary radical polymerization initiator such as a peroxide or a redox catalyst is used as the polymerization initiator and an anionic surfactant, a cationic surfactant, a nonionin surfactant, an amphoteric surfactant or any combination of these is used as the emulsifier in the emulsion polymerization process. The polymerization reaction is carried out in an oxygen-free reactor at a temperature of, normally, from 0° C. to 50° C. in the copresence of mercaptan as a molecular weight modifier. When a desired degree of polymerization is reached, a polymerization terminator such as for example N,N-diethylhydroxylamine is added to bring the polymerization reaction to an end. The residual monomer in the reaction product thus obtained in the form of latex is removed from the latex by steam distillation, whereupon an antioxidant such as an alkylated phenol or 2,6-ditertiary butyl cresol is added to the latex. The resultant preparation is then mixed with an aqueous solution of a metal salt such as for example aluminum sulfate or calcium chloride so as to be solidified into the form of crumbs. The copolymerized elastomer is obtained by drying these crumbs.

It is important that the copolymerized elastomer thus obtained contain the functional monomer in 5 percent by weight or more. If the proportion of the functional monomer in the copolymerized elastomer is less than 5 percent by weight, the adhesive compound according to the present invention could not exhibit its tenacious adhesiveness, adaptability to various kinds of materials, excellent shear and adhesive strengths and prominent resistances to, for example, hot water, hot moisture and thermal deterioration. While there is no definite upper limit of the proportion of the functional monomer in the copolymerized elastomer, it is advisable to have the monomer contained in the copolymerized elastomer in a proportion up to 20 percent by weight. The copolymerized elastomer thus prepared is contained in the adhesive compound according to the present invention preferably in a proportion ranging from 1 percent by weight to 40 percent by weight. If the proportion of the copolymerized elastomer in the adhesive compound is less than 1 percent by weight, the resultant adhesive compound will become fluid and fail to provide a satisfactory friction-pull strength. If, conversely, the proportion of the elastomer in the adhesive compound is more than 40 percent by weight, then the resultant adhesive compound will become so tacky that difficulties would be encountered in blending and applying the adhesive compound during use of the compound.

Furthermore, the organic peroxide to be used as the composition (c) of the adhesive compound used in a loud speaker assembly according to the present invention is preferably one or any combination of two or more of (1) a hydroperoxide selected from the group consisting of tert-butyl hydroperoxide, cumene hydroperoxide, diisopropylbenzene hydroperoxide, p-menthane hydroperoxide, 2,5-dimethylhexane hydroperoxide and 2,5-di-1,1,3,3-tetramethylbutyl hydroperoxide; (2) a dialkyl peroxide selected from the group consisting of di-tert-butylperoxide, dicumenyl peroxide and α,α-bis(tertbutylperoxyisopropyl)benzene; (3) a diacyl peroxide selected from the group consisting of acetyl peroxide, isobutyl peroxide, benzoyl peroxide, lauroyl peroxide and 2,4-dichlorobenzoyl peroxide; (4) a ketone peroxide selected from the group consisting of methyl ethyl ketone peroxide, cyclohexanone peroxide and acetylaceton peroxide; (5) a peroxyketal (peroxyketone acetal) selected from the group consisting of 1,1-bis(-tert-butylperoxy)-3,3,5-trimethyl cyclohexane and 2,2-bis(tert-butylperoxy)octane; (6) a peroxycarbonate selected from the group consisting of diisopropyl peroxydicarbonate and di-2-ethoxyethyl peroxydicarbonate; and (7) a peroxyester selected from the group consisting of tert-butyl peroxyisobutylate, tert-butyl peroxypivalate, cumenyl peroxyneodecanoate and tert-butyl peroxylaurate. Particularly preferred of these peroxides are a hydroperoxide, a diacylperoxide, a peroxyketal, a peroxycarbonate or any combination of one or more of these.

The organic peroxide is contained in the adhesive compound in 0.1 percent by weight to 20 percent by weight to the concentration of the functional monomer contained in the copolymerized elastomer. If the proportion of the organic peroxide in the adhesive compound is less than 0.1 percent by weight, the resultant adhesive compound could not be set properly and would thus fail to provide a desired degree of adhesiveness. If the proportion of the organic proxide in the adhesive compound is more than 20 percent by weight, then the adhesive compound could not have a sufficient degree of stability in storage.

The adhesive compound used to assemble a loud speaker assembly according to the present invention may be applied to the members to be bonded together of the loud speaker assembly either by the aid of a decomposition promoting agent for the organic peroxide or by heating the adhesive compound per se without using a decomposition promoting agent for the organic peroxide. The adhesive compound according to the present invention may thus be applied to the surfaces of the members to be bonded together of a loud speaker assembly in any of the following five methods.

1. The adhesive compound according to the present invention is heated and applied in a molten state to the surfaces of the members to be bonded together without use of a decomposition promotor.

2. A decomposition promotor is applied to the surfaces of the members to be bonded together to form a foundation coating on each of the surfaces without use of any other chemical composition such as a solvent and/or a plasticizer. The adhesive compound according to the present invention is applied to the foundation coating thus formed on the surface of each of the members to be bonded together.

3. A decomposition promotor is dissolved in a chemical composition such as a solvent and/or a plasticizer before being applied to the surfaces of the members to be bonded together. The chemical composition to be used for this purpose may be selected from the group which consists of acetone, methyl ethyl ketone, methyl isobutyl ketone, ethyl acetate, butyl acetate, benzene, toluene, ethyl alcohol, propyl alcohol, chloroform, dioctyl phthalate and dibutyl phthalate. The mixed solution of the decomposition promotor and any of these chemical compositions is applied to the surfaces of the members to be bonded together to form a foundation coating on each of the surfaces. The adhesive compound according to the present invention is applied to the foundation coating thus formed on the surface of each of the members to be bonded together.

4. A decomposition promotor is added to a monomer solution containing a monomer selected from the group consisting of alkyl acrylate, alkyl methacrylate, acrylic acid or methacrylic acid and a copolymerized elastomer dissolved in the monomer, the copolymerized elastomer containing butadiene and/or isoprene, an unsaturated nitrile and a functional monomer. The monomer solution is applied to the surface of each of the members to be bonded together to form a foundation coating thereon, whereupon a chemical composition containing an organic peroxide of any of the types above specified, is applied to this coating of the monomer solution. In carrying out this method, it is important that the quantities and proportions of the components of the monomer solution and the quantities and proportions of the components of the chemical composition containing the organic peroxide be selected so that the resultant compound contains the above mentioned compositions (a), (b) and (c) in proportions equal to those specified in regard to these compositions.

5. A decomposition promotor is added to a monomer solution containing a monomer selected from the group consisting of alkyl acrylate, alkyl methacrylate, acrylic acid or methacrylic acid and a copolymerized elastomer dissolved in the monomer and similar in composition to the copolymerized elastomer to be used as the composition (b) in the adhesive compound according to the present invention. The adhesive compound according to the present invention, containing the organic peroxide of any of the types above specified, is dissolved in this monomer solution and the resultant solution is applied to the surface of each of the members to be bonded together.

In carrying out the method 4 or 5 above, it is important that the quantities and proportions of the components of the monomer solution and the quantities and proportions of the components of the chemical composition containing the organic peroxide be selected so that the resultant compound contains the above mentioned compositions (a), (b) and (c) in proportions respectively equal to those specified in regard to these compositions.

While a decomposition promoting agent is used to form a foundation coating on the surface of each of the members to be bonded together in each of the methods 2 to 5 above, a chemical composition containing an organic peroxide may if desired be used to form a foundation coating. Thus, the adhesive compound according to the present invention may be applied to the surfaces of the members to be bonded together of a loud speaker assembly in any of the following methods.

6. An organic peroxide is mixed with a monomer solution containing a decomposition promotor and a copolymerized elastomer containing butadiene and/or isoprene, an unsaturated nitrile and a functional monomer. The resultant preparation is applied to the surface of each of the members to be bonded together.

7. A peroxide solution containing an organic peroxide dissolved in a chemical composition such as a solvent and/or a plasticizer is mixed with a monomer solution containing a decomposition promotor and a copolymerized elastomer containing butadiene and/or isoprene, an unsaturated nitrile and a functional monomer. The resultant preparation is applied to the surface of each of the members to be bonded together.

8. An organic peroxide is applied to the surfaces of the members to be bonded together to form a foundation coating on each of the surfaces without use of any other chemical composition such as a solvent and/or a plasticizer. A monomer solution containing a decomposition promotor and a copolymerized elastomer containing butadiene and/or isoprene, an unsaturated nitrile and a functional monomer is applied to the foundation coating of the organic peroxide formed on the surface of each of the members to be bonded together.

9. A peroxide solution containing an organic peroxide dissolved in a chemical composition such as a solvent and/or a plasticizer is applied to the surfaces of the members to be bonded together to form a foundation coating on each of the surfaces. A monomer solution containing a decomposition promotor and a copolymerized elastomer containing butadiene and/or isoprene, an unsaturated nitrile and a functional monomer is applied to the foundation coating of the peroxide solution formed on the surface of each of the members to be bonded together.

The chemical composition to have the organic peroxide dissolved therein in the method 7 or 9 above may be selected from the group which consists of acetone, methyl ethyl ketone, methyl isobutyl ketone, ethyl acetate, butyl acetate, benzene, toluene, ethyl alcohol, propyl alcohol, chloroform, dioctyl phthalate and dibutyl phthalate. In carrying out the method 8 or 9 above, it is also important that the quantities and proportions of the components of the monomer solution and the quantity of the organic peroxide as in method 8 or the quantities and proportions of the components of the chemical composition containing the organic peroxide as in the method 9 be selected so that the resultant compound contains the previously mentioned compositions (a), (b) and (c) in proportions respectively equal to those specified in regard to these compositions.

The decomposition promoting agent to be used for the application of the adhesive compound according to the present invention is selected in consideration of the set time and the strength of adhesion achievable on a practical basis. Operable as such a decomposition promoting agent is one or any combination of two or more of (1) a tertiary amine selected from the group consisting of N,N-dimethylaniline, N-N-dimethyltoluidine, N-N-diethyltoluidine and triethylamine; (2) a polyamine selected from the group consisting of diethylenetriamine, triethylenetetramine and pentaethylenehexamine; (3) a thioamido composition selected from the group consisting of thiourea, trimethyl thiourea, tetramethyl thiourea, dibutyl thiourea, dilauryl thiourea, acetyl thiourea, ethylene thiourea, diphenyl thiourea, trimethyl thiourea, ditolyl thiourea and mercaptobenzimidazole; (4) a metallic soap selected from the group consisting of cobalt naphthenate, manganese naphthenate and iron oleate; (5) an organic metal complex selected from the group consisting of cobalt acetylacetone complex and dipyridyl-iron complex; (6) a reduction type organic composition selected from the group consisting of L-ascorbic acid, D-iso-ascorbic acid and gallic acid; and (7) a triazine thiol selected from the group consisting of triazine-trithiol and dibutylaminotriazine thiol. Particularly preferred of these are a tertiary amine, a polyamine, a thioamide composition and a reduction type organic composition. The proportion of the decomposition promotor with respect to the total quantity of the adhesive compound is preferably within the range of 0.1 percent by weight to 20 percent by weight to the quantity of the monomer contained in the adhesive compound. If the proportion of the decomposition promotor to the total quantity of the monomer in the adhesive compound is less than 0.1 percent by weight, difficulties would be encountered in achieving a set time of the adhesive compound within a practically permissible range. If the proportion of the decomposition promotor to the total quantity of the monomer in the adhesive compound is more than 20 percent by weight, then critical reduction of the adhesive strength of the adhesive compound would result.

In order to achieve an increased stability of storage of the adhesive compound to be used in accordance with the present invention, a polymerization inhibitor may be added in a small quantity to the adhesive compound. Operable as the polymerization inhibitor to be used for this purpose is a composition selected from the group consisting of hydroquinone, methylhydroquinone, hydroquinonemonomethyl ether, p-benzoquinone, toluquinone, xxyloquinone, catechol, tertbutylcatechol, 2-tert-butyl-p-xydroxyanisole, 2,6-di-tert-butyl-p-cresole, picric acid, phenothiadine, hydroxydiphenylamine, diphenylpicrylhydrazyl and galvinoxyl. The proportion of the polymerization inhibitor with respect to the total quantity of the adhesive compound is preferably less than 2 percent by weight. A proportion of the polymerization inhibitor more than 2 percent by weight would result in extreme prolongation of the set time of the adhesive compound and significant reduction in the adhesive strength of the adhesive compound.

The adhesive compound to be used in accordance with the present invention is adapted to achieve increased adhesive strengths to various kinds of materials as compared to any known adhesive compounds. Such adhesive strengths of the adhesive compound can be further increased especially to synthetic resins, cloths, paper and cardboards when an unsaturated alkyd resin is added to the adhesive compound. Preferred examples of the unsaturated alkyd resin to be used for this purpose include a product of polycondensation reaction between an unsaturated dibasic acid and a glycol. The proportion of the unsaturated alkyd resin with respect to the total quantity of the adhesive compound is preferably within the range of from 1 percent by weight to 20 percent by weight. A proportion of the unsaturated alkyd resin higher or lower than this range would result in failure to accomplish the above mentioned purpose. Addition of an unsaturated alkyd resin to the adhesive compound in the specified range is conducive not only to increasing the adhesive strength of the adhesive compound but also to giving a certain degree of tackiness to the adhesive compound.

Also a filler, a gelating composition, a plasticizer and/or a coloring composition may if desired be added to the adhesive compound to be used in accordance with the present invention.

To evaluate the set time and the adhesive strength of the adhesive compound used in accordance with the present invention, examples of the adhesive compound were prepared by putting monomers (each as the composition (a) in the adhesive compound according to the present invention), copolymerized elastomers (each as the composition (b) in the adhesive compound according to the present invention) and unsaturated alkyd resins in flasks of 2 liter capacity and were stirred for 24 hours at an atmospheric temperature to produce uniformly mixed solutions in the flasks. Organic peroxides (each as the composition (c) in the adhesive compound according to the present invention) having some additives contained therein were added to these solutions and the resultant preparations were further stirred for 24 hours. The adhesive compounds obtained in these manners were tested for tensile shear strengths (with the load rate of 5 mm/min) and T-type friction-pull strengths (with the load rate of 50 mm/min) in accordance with the related standards of Japanese Industrial Standards (JIS) or the corresponding standards of American Society for Testing Materials (ASTM). Used as the members to be bonded together in these tests were 1.5 mm thick plates of metal and 3 mm thick plastic panels. The surfaces of each metal plate were degreased with trichloroethylene and the surfaces of each plastic panel were cleaned with methyl alcohol. Cleaning by sand blasting were not carried out on the metal plates. Also used as the members to be bonded together were webs of cloth and paper, which were not subjected to any cleaning process. The set time of each of the adhesive compounds used as the specimens was determined as the period of time intervening the time at which a cold rolled steel plate with a plain surface was attached to another cold rolled steel plate having an adhesive coating of 1 mm thickness on the surface thereof and the time at which the two steel plates became fast on each other against finger pressures applied to the plates in opposite directions parallel with the bonded surfaces of the plates.

The chemical compositions of the adhesive compounds used in the tests are shown in Table 1, wherein the adhesive I consists of solutions A and B each containing an unsaturated alkyd resin to add tackiness to the adhesive and the adhesive II consists of solutions A' and B' each devoid of an unsaturated alkyd resin. Each of the solutions A and A' contains an organic peroxide and a polymerization inhibitor and does not contain a decomposition promotor for the organic peroxide, while each of the solutions B and B' contains a decomposition promotor for an organic peroxide and does not contain an organic peroxide and a polymerization inhibitor. The acronyms MMA and MAA represent alkyl methacrylate and methacrylic acid, respectively, each used as the composition (a) in the adhesive compound according to the present invention. The acronym CHP represents cumene hydroperoxide used as the organic peroxide and the acronym BQ represents p-benzoquinone used as the polymerization inhibitor. The copolymerized elastomer used as the composition (b) consists of 41 percent by weight of acrylonitrile, 11 percent by weight of glycidyl methacrylate and remaining percent of butadiene. The proportions of the components in the total quantities of the adhesive compounds are indicated in terms of parts by weight.

The solutions A and B were mixed together in the ratio of 1 vs. 1 by weight to obtain a two-part adhesive compound as the adhesive I and, likewise, the solutions A' and B' were mixed together in the ratio of 1 vs. 1 by weight to obtain a two-part adhesive compound as adhesive II.

TABLE 1

| | Adhesive I | | Adesive II | |
| --- | --- | --- | --- | --- |
| | Solution A | Solution B | Solution A' | Solution B' |
| Monomer | MMA/MAA 90/10 | MMA/MAA 90/10 | MMA/MAA 90/10 | MMA/MAA 90/10 |
| Copolymerized Elastomer | 22 | 21 | 22 | 21 |
| Unsaturated Alkyd Resin* | 5 | 5 | Nil | Nil |
| Organic Peroxide | CHP 6 | Nil | CHP 6 | Nil |
| Decomposition Promotor | Nil | 1-acetyl-2-thiourea 3 | Nil | 1-acetyl-2-thiourea 3 |
| Polymerization Inhibitor. | BQ 0.1 | Nil | BQ 0.1 | Nil |

TABLE 1-continued

| | Adhesive I | | Adesive II | |
| --- | --- | --- | --- | --- |
| | Solution A | Solution B | Solution A' | Solution B' |

*"Polyset 548" manufactured by Hitachi Chemical Company, Limited (Tokyo, Japan)

Table 2 shows the set times (in minutes or days) and the adhesive strengths (in kgs/cm$^2$) of these two-part adhesives I and II when the adhesives are applied to members of various materials such as iron, aluminum, stainless steel, polymethyl methacrylate (PMMA) resin, soft polyvinyl chloride (PVC) resin, acrylonitrile-butadiene-styrene (ABS) copolymer resin, a fiber-reinforced plastic (FRP) and 6-Nylon. In Table 2 are further shown the results of the tests conducted with each of the adhesives I and II to determine the friction-pull strengths (in kgs/25 mm) at the load rate of 50 mm/min. between a sheet iron and a canvas sheet (No. 9) and between an iron plate and a sheet of paper (75 grs/m$^2$).

TABLE 2

| Specimens Set Time | Adhesive I 6 min. | Adhesive II — | Adhesive III 6 min. | Adhesive IV 10 days |
| --- | --- | --- | --- | --- |
| Tensile Shear Strength (kgs/cm$^2$) | | | | |
| Iron[1] | 290 | 280 | 200 | 280 |
| Iron[2] | 100 | 100 | — | — |
| Iron[3] | 40 | 45 | — | — |
| Aluminum | 120 | — | 80 | 280 |
| Stainless steel | 240 | — | 180 | 140 |
| PMMA | 60* | 60* | 30 | 210 |
| Soft PVC | 20* | 15 | 5 | — |
| ABS | 65* | 60* | 20* | — |
| FRP | 45 | 30 | 30 | — |
| 6-Nylon | 60 | 40 | 40 | — |
| T-type Friction Pull Strength (kgs/25 mm) | | | | |
| Iron | 22 | — | 22 | 9 |
| 180° Friction[4] Pull Strength (kgs/25 mm) | | | | |
| Canvas/Iron[5] | 10 | — | Not set | — |
| Paper/iron[6] | *(Paper) | — | Not set | — |

[1]At room temperature.
[2]At 80° C. temperature.
[3]At 120° C. temperature.
[4]At 40 mm/min load rate.
[5]No. 9 canvas was used.
[6]75 grams/m$^2$ paper was used.

To evaluate the results of the tests conducted with the two-part adhesives I and II in comparison with known adhesive compounds of the two-part types, Table 2 further show the results of the tests conducted with a commercially available acrilic and epoxy adhesive compounds which are denoted as adhesives III and IV, respectively, in Table 2. The tests thus conducted with the adhesives III and IV are similar to those conducted with the adhesives I and II. From comparison of the results of the tests conducted with the adhesives I and II to be used in a loud speaker assembly according to the present invention with the results of the tests conducted with the adhesives III and IV it will be clearly appreciated that the former two are notably more excellent in adhesive strength and set time than the latter two.

Tests were further conducted with the two-part adhesives I and III to evaluate the adhesive strengths of the adhesives applied to cleaned, viz., degreased surfaces and surface stained with oil of steel plates. The steel plates with the cleaned surfaces were degreased with trichloroethylene, while the steel plates with the oil-stained surfaces were, after having been degreased with trichloroethylene, coated with a rust-preventive oil (P-1400) and were allowed to stand at the temperature of 60° C. for 24 hours. Table 3 shows the results of these tests, from which it will be seen that the adhesive I to be used in a loud speaker assembly according to the present invention also notably excels the commercially available two-part adhesive III in this respect.

TABLE 3

| Specimens | Adhesive I | Adhesive III |
|---|---|---|
| Tensile shear strength (kgs/cm$^2$) | | |
| Cleaned surface | 290 | 200 |
| Oil-stained surface | 280 | 120 |
| T-type Friction-pull strength (kgs/25 mm) | | |
| Cleaned surface | 22 | 22 |
| Oil-stained surface | 21 | 6 |

BRIEF DESCRIPTION OF THE DRAWINGS

The features and advantages of a loud speaker assembly according to the present invention will be more clearly appreciated from the following description taken in conjunction with the accompanying drawings in which.

DESCRIPTION OF THE PREFERRED EMBODIMENT

Figure 1:
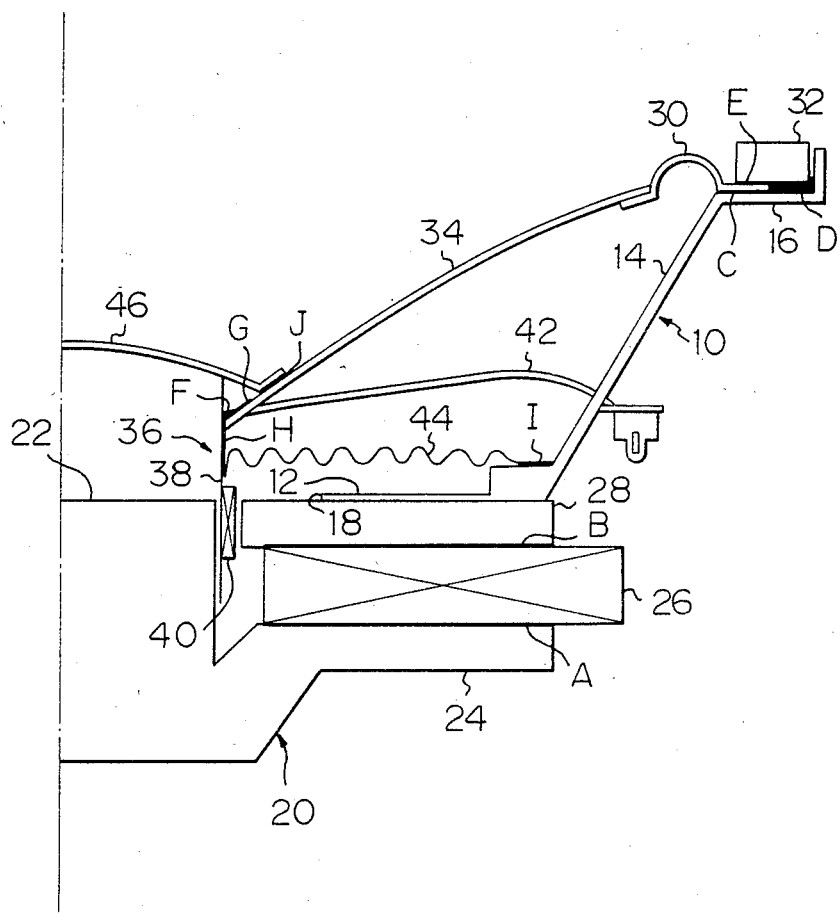
FIG. 1 is a cross sectional view showing a diametrical half of a loud speaker assembly embodying the present invention, viz., including component members assembled together with use of an adhesive compound according to the present invention.

Referring to FIG. 1 of the drawings, a loud speaker assembly embodying the present invention is assumed, by way of example, to be of the dynamic cone type and comprises a frame or cone housing 10 having an annular base wall portion 12 and a generally frusto-conical side wall portion 14 flaring from the outer circumference of the base wall portion 12. The cone housing 10 further has a annular rim portion 16 extending along the outer circumference of the side wall portion 14. The base wall portion 12 is formed with a circular central aperture 18.

A ferromagnetic yoke or field magnet support member 20 has a generally cylindrical central pole-piece portion 22 axially projecting into the central aperture 18 in the cone housing 10, and an annular magnet support portion 24 coaxially surrounding the central pole-piece portion 22. The magnet support portion 24 has an inner end face spaced apart in parallel from the outer face of the base wall portion 12 of the cone housing 10. An annular field magnet 26 is positioned in coaxially surrounding relationship to the central polepiece portion 22 of the magnet support member 20 and has one end face bonded with a coating of an adhesive compound to this inner end face of the magnet support portion 24 as indicated at A. A ferromagnetic annular pole-piece plate 28 is also positioned in coaxially surrounding relationship to the central pole-piece portion 22 of the magnet support member 20 and has one end face bonded with a coating of an adhesive compound to the other end face of the magnet 26 as indicated at B. The other end face of the pole-piece plate 28 is attached to the outer face of the base wall portion 12 of the cone housing 10. The pole-piece plate 28 has its inner peripheral surface radially spaced apart from the outer peripheral surface of the central pole-piece portion 22 of the cone housing and forms an annular gap therebetween. The magnet support member 20, field magnet 26 and pole-piece plate 28 thus constructed constitute in combination a magnetic circuit structure forming an annular air gap to have a magnetic field established therein.

The outer rim portion 16 of the cone housing 10 has an annular edge member 30 bonded to the inner face thereof with a coating of an adhesive compound as indicated at C. The edge member 30 is attached to the rim portion 16 of the cone housing 10 by the aid of an annular baffle gasket 32 which is in part bonded to the rim portion 16 of the cone housing 10 with a coating D of an adhesive compound and in part to the edge member 32 with a coating E of an adhesive compound. The edge member 30 is formed of a sheet of paper, cloth or synthetic resin and the baffle gasket 32 is formed of paper a synthetic resin or an elastomer, as well known in the art. The edge member 30 is shown as being of the ohm-type or rolled-type but may be of any configuration or type. A frusto-conical vibrator cone 34 has an outer peripheral portion bonded to an inner peripheral portion of the edge member 30 and has its inner peripheral edge located in alignment with the annular gap between the pole-piece plate 28 and the central pole-piece portion 22 of the magnet support member 20. The vibrator cone 34 is formed of a sheet of cloth, paper, metal or synthetic resin as is also well known in the art. A generally cylindrical voice coil unit 36 comprises a cylindrical coil support bobbin 38 and a coil 40 helically wound on the outer peripheral surface of the bobbin 38. The coil support bobbin 38 axially extends through the central opening in the vibrator cone 34 and through the gap between the pole-piece plate 28 and the central pole-piece portion 22 of the magnet support member 20. The coil 40 is thus in part located in this gap and accordingly intervenes radially between the inner peripheral surface of the pole-piece plate 28 and the outer peripheral surface of the central pole-piece portion 22 of the magnet support member 20. The coil support member 38 is formed of a sheet of paper, synthetic resin or metal. The vibrator cone 34 is bonded at and along its inner peripheral edge to an outer peripheral surface of the coil support bobbin 38 with a coating of an adhesive compound as indicated at F. The coil 40 is electrically connected to a lead wire 42 which is secured to an inner peripheral edge portion of the vibrator cone 34 with a coating of an adhesive compound as indicated at G. A generally annular damper or spider element 44 is positioned axially between the vibrator element 34 and the base wall portion 14 of the cone housing 10 and is bonded at and along its inner peripheral edge to the outer peripheral surface of the coil support bobbin 38 with a coating of an adhesive compound as indicated at H and at and along its outer peripheral edge to the cone housing 10 along the junction between the base wall portion 12 and side wall portion 14 of the cone housing 10 with a coating of an adhesive compound as indicated at I. The spider element 44 is formed of a sheet of cloth or paper and serves to have the voice coil unit 36 held in concentric position with respect to the air gap in the above mentioned magnetic circuit structure and additionally to cover the air gap to prevent an ingress of dust into the air gap. The edge member 30, baffle gasket 32, vibrator cone 34, voice coil unit 36 and spider element 44 constitute in combination an electromechanical acoustic structure in the loud speaker assembly. The open end of the coil support bobbin 38 projecting from the central opening of the vibrator cone 34 is closed by a generally circular center cap member 46 having an outer peripheral edge portion bonded to an inner peripheral portion of the vibrator cone 34 with a coating of an adhesive compound as indicated at J.

The manner of operation of the loud speaker assembly thus constructed is not only immaterial to the understanding of the gist of the present invention but self-explanatory to those skilled in the art and for this reason will not be herein described.

Each of the adhesive coatings A to J used in the above described loud speaker assembly is formed by the adhesive compound of the nature hereinbefore described. The adhesive compound used in the loud speaker assembly is applied to the members bonded by these coatings preferably by any of the previously described methods 1 to 9.

Figure 2:
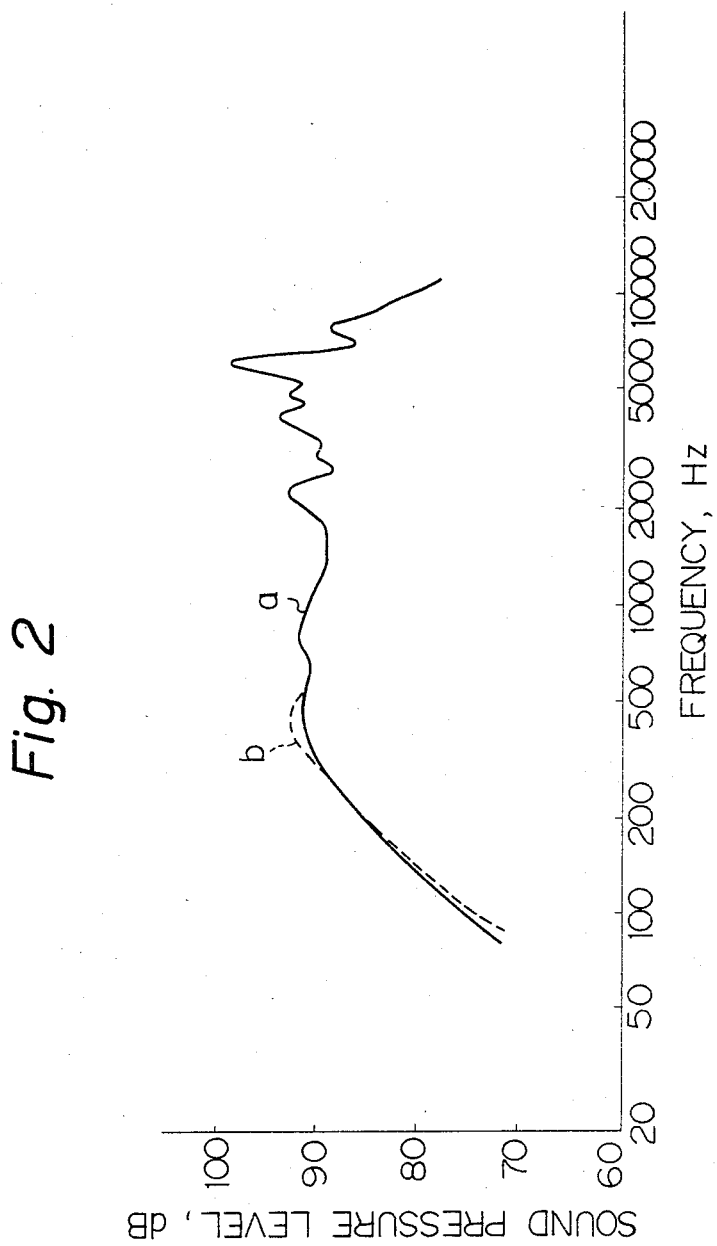
FIG. 2 is a graph showing frequency-sound pressure curves of a loud speaker assembly using an adhesive compound in accordance with the present invention and a loud speaker using a conventional rubber-based adhesive of the two-part type.

FIG. 2 of the drawings shows frequency-sound pressure curves a and b which indicate the results of the tests conducted to evaluate the performance of a loud speaker assembly according to the present invention and a loud speaker using a known rubber-based adhesive compound of the two-part type. In FIG. 2, the curve a in full line indicates the variation of the output sound pressure level in decibels as achieved at various frequencies in the loud speaker assembly according to the present invention and the curve b in broken line indicates the variation of the output sound pressure level in decibels as achieved at various frequencies in the loud speaker using the known adhesive compound. Comparison between these two frequency-sound pressure curves a and b will show that the loud speaker assembly according to the present invention is operable for a frequency range considerably broader, particularly at relatively low frequencies, than the frequency range for which the loud speaker using the conventional adhesive compound is operable. This is considered to be because of of the fact that the edge member of the loud speaker assembly according to the present invention is free from displacement with respect to the cone housing and the vibrator cone and that the vibrator cone is held in coaxial relationship to the cone housing and the voice coil unit more strictly than in the loud speaker using the conventional adhesive compound. Other advantages of a loud speaker assembly according to the present invention are as follows:

(1) The adhesive compound used in a loud speaker assembly according to the present invention contains a solvent in a concentration far lower than the concentration of the solvent contained in a conventional rubber-based adhesive of the two-part type. The adhesive compound used in a loud speaker assembly according to the present invention can therefore be set in a significantly reduced period of time and only a limited amount of air contaminant is generated during setting of the adhesive compound.

(2) Since the adhesive compound is thus set in a short period of time, loud speakers using the adhesive compound can be assembled in a single production line including a final inspection stage, thus giving rise to an increase in the production efficiency of loud speakers.

(3) For its excellent adhesive strength to oil-stained surfaces, the adhesive compound used in a loud speaker assembly according to the present invention is capable of securely coupling the cone housing, magnet and magnet support member to each other or to any other members.

(4) Because of its broad adaptability to materials of different natures, the adhesive compound used in a loud speaker assembly according to the present invention is useful for the coupling of the edge member and the baffle gasket especially where these elements are formed of different materials and/or where the elements vary from loud speakers of one type to those of another. This will further mean that all the component members to be bonded together of a loud speaker assembly can be bonded together with use of only one kind of adhesive compound.

(5) The adhesive compound can be applied uniformly over the surface to be bonded to another surface and will contribute significant reduction of the buzzing sound to be generated from the loud speaker assembly during operation of the speaker assembly.

While only one preferred embodiment of a loud speaker assembly according to the present invention has been described and shown, the construction of the loud speaker assembly hereinbefore described is merely for the purpose of illustration and is representative of loud speaker assemblies of various types and constructions. It should thus be borne in mind that the adhesive compound of the nature herein specified or any of the modifications of such an adhesive compound can be used in a loud speaker of any type and/or construction.

What is claimed is:

1. A loud speaker assembly including members which are bonded together with a single adhesive compound, said adhesive compound comprising (a) at least one composition selected from the group consisting of alkyl acrylate, alkyl methacrylate, acrylic acid and methacrylic acid; (b) a copolymerized elastomer including 5 to 20 percent by weight of at least one member selected from the group consisting of (1) an acrylate or a methacrylate having an epoxy radical, (2) a hydroxyalkylmethancrylate or a hydroxyalkylacrylate, (3) a dialkylaminoalkyl acrylate or a dialkylaminoalkyl methacrylate, and mixtures thereof, said elastomer further including an unsaturated nitrile and at least one of butadiene and isoprene; and (c) an organic peroxide.

2. A loud speaker assembly as set forth in claim 1, comprising a generally frusto-conical cone housing and an electromechanical acoustic structure supported by said cone housing, said cone housing having an annular outer rim portion, wherein said electromechanical acoustic structure comprises an annular edge member securely attached to and extending along said rim portion of the cone housing, characterized in that said members which are bonded together with said adhesive compound consist of the outer rim portion of said cone housing said edge member which is bonded with said adhesive compound to said outer rim portion.

3. A loud speaker assembly as set forth in claim 1, comprising a generally frusto-conical cone housing and an electromechanical acoustic structure supported by said cone housing, said cone housing having an annular outer rim portion, wherein said electromechanical acoustic structure comprises an annular baffle gasket extending along and securely attached to said rim portion of the cone housing, characterized in that said members which are bonded together with said adhesive compound consist of the outer rim portion of said cone housing and said baffle gasket which is bonded with said adhesive compound to said outer rim portion.

4. A loud speaker assembly as set forth in claim 1, comprising a generally frusto-conical cone housing and an electromechanical acoustic structure supported by said cone housing, said cone housing having an annular outer rim portion, wherein said electromechanical acoustic structure comprises an annular edge member securely attached to and extending along said rim portion of the cone housing and an annular baffle gasket extending along said rim portion of the cone housing, said baffle gasket being securely attached in part to said edge member and in part to said rim portion of said cone housing, characterized in that said members which are bonded together with said adhesive compound consist of the outer rim portion of said cone housing, said edge member which is bonded with said adhesive compound to the outer rim portion, and said baffle gasket which is bonded with said adhesive compound in part to said edge member and in part to said outer rim portion.

5. A loud speaker assembly as set forth in claim 1, comprising a generally frusto-conical cone housing and an electromechanical acoustic structure supported by said cone housing, said cone housing having an annular base wall portion formed with a central aperture and an annular outer rim portion coaxial with said base wall portion, wherein said electromechanical acoustic structure comprises an annular edge member securely attached to and extending along said rim portion of the cone housing, a generally frusto-conical vibrator cone secured along its outer circumference to said edge member and formed with a central opening axially aligned with said aperture in said cone housing, and a generally cylindrical voice coil unit axially extending through said aperture in the cone housing and through said opening in the vibrator cone and securely attached to said vibrator cone along the inner circumference of the cone, characterized in that said members which are bonded together with said adhesive compound consist of said vibrator cone and said voice coil unit which is bonded with said adhesive compound to said voice coil unit along the inner circumference thereof.

6. A loud speaker assembly as set forth in claim 1, comprising a generally frusto-conical cone housing and an electromechanical acoustic structure supported by said cone housing, said cone housing having an annular base wall portion formed with a central aperture, wherein said electromechanical acoustic structure comprises a generally cylindrical voice coil unit axially extending through said aperture in the cone housing and a generally annular damper element axially spaced apart from said base wall portion of said cone housing and securely attached along its outer circumference to said side wall portion of said cone housing and along its inner circumference to said voice coil unit, characterized in that said members which are bonded together with said adhesive compound consist of said cone housing and said damper element which is bonded along its outer circumference to said cone housing with said adhesive compound.

7. A loud speaker assembly as set forth in claim 1, comprising a generally frusto-conical cone housing and an electromechanical acoustic structure supported by said cone housing, said cone housing having an annular base wall portion formed with a central aperture, wherein said electromechanical acoustic structure comprises a generally cylindrical voice coil unit axially extending through said aperture in the cone housing and a generally annular damper element axially spaced apart from said base wall portion of said cone housing and securely attached along its outer circumference to said side wall portion of said cone housing and along its inner circumference to said voice coil unit, characterized in that said members which are bonded together with said adhesive compound consist of said voice coil unit and said damper element which is bonded along its inner circumference to said voice coil unit with said adhesive compound.

8. A loud speaker assembly as set forth in claim 1, further comprising an electric lead wire secured at one end to said voice coil unit, characterized in that said members which are bonded together with said adhesive compound consist of said voice coil unit and said lead wire which is bonded with said adhesive compound to said voice coil unit.

9. A loud speaker assembly as set forth in claim 1, comprising a generally frusto-conical cone housing and an electromechanical acoustic structure supported by said cone housing, said cone housing having an annular outer rim portion, wherein said electromechanical acoustic structure comprises, a generally frusto-conical vibrator cone secured along its outer circumference to said outer rim portion of said cone housing and formed with a central opening and a center cap member having an outer peripheral edge portion bonded to an inner peripheral portion of said vibrator cone, characterized in that said members which are bonded together with said adhesive compound consist of said vibrator cone and said center cap member which has its outer peripheral edge portion bonded with said adhesive compound to said outer peripheral edge portion of said vibrator cone.

10. A loud speaker assembly as set forth in claim 1, comprising a magnetic circuit structure attached to said cone housing, said magnetic circuit structure comprising a magnet support member having a generally cylindrical pole-piece portion and an annular support portion coaxial with the pole-piece portion and an annular field magnet having an end face securely attached to said support portion of said magnet support member, characterized in that said members which are bonded together with said adhesive compound consist of said support portion of said magnet support member and said field magnet which has said end face thereof bonded with said adhesive compound to said support portion.

11. A loud speaker assembly as set forth in claim 1, comprising a magnetic circuit structure attached to said cone housing, said magnetic circuit structure comprising a magnet support member having a generally cylindrical pole-piece portion and an annular support portion coaxial with the pole-piece portion, an annular field magnet having one end face securely attached to said support portion of said magnet support member, and an annular pole-piece plate securely attached to the other end face of said field magnet, characterized in that said members which are bonded together with said adhesive compound consist of said support portion of said magnet support member and said pole-piece plate which has said other end face thereof bonded with said adhesive compound to said support portion.

12. A loud speaker assembly as set forth in claim 1, in which said composition is contained in the adhesive compound in a proportion more than 20 percent by weight to the total quantity of compositions containing unsaturated bonds in the adhesive compound.

13. A loud speaker assembly as set forth in claim 1, in which said composition is contained in the adhesive compound in a proportion more than 40 percent by weight to the total quantity of compositions containing unsaturated bonds in the adhesive compound.

14. A loud speaker assembly as set forth in claim 1, in which said alkyl acrylate has a number of carbons of from 1 to 4.

15. A loud speaker assembly as set forth in claim 1, in which said alkyl acrylate is selected from the group consisting of methyl acrylate, ethyl acrylate, propyl acrylate, butyl acrylate, isobutyl acrylate, tertiary butyl acrylate and octyl acrylate.

16. A loud speaker assembly as set forth in claim 1, in which said alkyl methacrylate has a number of carbons of from 1 to 4.

17. A loud speaker assembly as set forth in claim 1, in which said alkyl methacrylate is selected from the group consisting of methyl methacrylate, ethyl methacrylate, propyl methacrylate, butyl methacrylate, isobutyl methacrylate, tertiary butyl methacrylate, and octyl methacrylate.

18. A loud speaker assembly as set forth in claim 1, in which said coperimerized elastomer is contained in the adhesive compound in a proportion within the range of from 1 percent by weight to 40 percent by weight to the total quantity of the adhesive compound.

19. A loud speaker assembly as set forth in claim 1, in which said unsaturated nitrile is selected from the group consisting of acrylic nitrile and methacrylic nitrile.

20. A loud speaker assembly as set forth in claim 1, in which said functional monomer is selected from the group consisting of glycidyl acrylate or glycidyl methacrylate.

21. A loud speaker assembly as set forth in claim 1, in which said functional monomer consists of at least one composition selected from the group consisting of glycidyl acrylate and glycidyl methacrylate.

22. A loud speaker assembly as set forth in claim 1, in which said functional monomer is selected from the group consisting of hydroxyethyl acrylate, hydroxypropyl acrylate, hydroxyethyl methacrylate, or hydroxypropyl methacrylate.

23. A loud speaker assembly as set forth in claim 1, in which said functional monomer is selected from the group consisting of dimethylaminoethyle acrylate, dimethylaminoethyle acrylate, dimethylaminoethyle methacrylate, and diethylaminoethyle methacrylate.

24. A loud speaker assembly as set forth in claim 1, in which said functional monomer is contained in said copolymerized elastomer in a proportion less than 20 percent by weight to the total quantity of the copolymerized elastomer.

25. A loud speaker assembly as set forth in claim 1, in which said copolymerized elastomer is prepared by an emulsion polymerization process using a radical polymerization initiator and an emulsifier.

26. A loud speaker assembly as set forth in claim 25, which said radical polymerization initiator consists of one of a peroxide and a redox catalyst.

27. A loud speaker assembly as set forth in claim 25, in which said emulsifier contains at least one of an anionic surfactant, a cationic surfactant, a nonionin surfactant, and an amphoteric surfactant.

28. A loud speaker assembly as set forth in claim 25, in which said emulsion polymerization process is carried out in an oxygen-free reactor in the copresence of mercaptan as a molecular weight modifier.

29. A loud speaker assembly as set forth in claim 25, in which said emulsion polymerization process is terminated with use of N,N-diethylhydroxylamine as a polymerization terminator.

30. A loud speaker assembly as set forth in claim 1, in which said copolymerized elastomer further includes an antioxidant, said antioxidant being selected from the group consisting of an alkylated phenol and 2,6-ditertiary butyl cresol.

31. A loud speaker assembly as set forth in claim 1, in which said copolymerized elastomer further includes a metal salt, said metal salt being selected from the group consisting of aluminum sulfate and calcium chloride.

32. A loud speaker assembly as set forth in claim 1, in which said organic peroxide is contained in the adhesive compound in a proportion within the range of from 0.1 percent by weight to 20 percent by weight to the concentration of the functional monomer contained in the copolymerized elastomer.

33. A loud speaker assembly as set forth in claim 1, in which said organic peroxide includes a hydroperoxide.

34. A loud speaker assembly as set forth in claim 33, in which said hydroperoxide is selected from the group consisting of tert-butyl hydroperoxide, cumene hydroperoxide, diisopropylbenzene hydroperoxide, p-menthane hydroperoxide, 2,5-dimethylhexane hydroperoxide and 2,5-di-1,1,3,3-tetramethylbutyl hydroperoxide.

35. A loud speaker assembly as set forth in claim 1, in which said organic peroxide includes a dialkyl peroxide.

36. A loud speaker assembly as set forth in claim 35, in which said dialkyl peroxide is selected from the group consisting of di-tert-butylperoxide, dicumenyl peroxide and α,α-bis(tert-butylperoxyisopropyl)benzene.

37. A loud speaker assembly as set forth in claim 1, in which said organic peroxide includes a diacyl peroxide.

38. A loud speaker assembly as set forth in claim 37, in which said diacyl peroxide is selected from the group consisting of acetyl peroxide, isobutyl peroxide, benzoyl peroxide, lauroyl peroxide and 2,4-dichlorobenzoyl peroxide.

39. A loud speaker assembly as set forth in claim 1, in which said organic peroxide includes ketone.

40. A loud speaker assembly as set forth in claim 1, in which said ketone peroxide is selected from the group consisting of methyl ethyl ketone peroxide, cyclohexanone peroxide and acetylaceton peroxide.

41. A loud speaker assembly as set forth in claim 1, in which said organic peroxide includes a peroxyketal.

42. A loud speaker assembly as set forth in claim 41, in which said peroxyketal is selected from the group consisting of 1,1-bis(tert-butylperoxy)-3,3,5-trimethyl cyclohexane and 2,2-bis(tert-butylperoxy)octane.

43. A loud speaker assembly as set forth in claim 1, in which said organic peroxide includes a peroxycarbonate.

44. A loud speaker assembly as set forth in claim 43, in which said peroxycarbonate is selected from the group consisting of diisopropyl peroxydicarbonate and di-2-ethoxyethyl peroxydicarbonate.

45. A loud speaker assembly as set forth in claim 1, in which said organic peroxide includes a peroxyester.

46. A loud speaker assembly as set forth in claim 45, in which said peroxyester is selected from the group consisting of tert-butyl peroxyisobutylate, tert-butyl peroxypivalate, cumenyl peroxyneodecanoate and tert-butyl peroxylaurate.

47. A loud speaker assembly as set forth in claim 1, in which said adhesive compound is applied to said members by the aid of a decomposition promoting composition for said organic peroxide.

48. A loud speaker assembly as set forth in claim 47, in which said decomposition promoting composition is used in a proportion within the range of 0.1 percent by weight to 20 percent by weight to the quantity of the monomer contained in the adhesive compound.

49. A loud speaker assembly as set forth in claim 47, in which said decomposition promoting composition includes a tertiary amine.

50. A loud speaker assembly as set forth in claim 49, in which said tertiary amine is selected from the group consisting of N,N-dimethylaniline, N-N-dimethyltoluidine, N-N-diethyltoluidine and triethylamine.

51. A loud speaker assembly as set forth in claim 47, in which said decomposition promoting composition includes a polyamine.

52. A loud speaker assembly as set forth in claim 51, in which said polyamine is selected from the group consisting of diethylenetriamine, triethylenetetramine and pentaethylenehexamine.

53. A loud speaker assembly as set forth in claim 47, in which said decomposition promoting composition includes a thioamido composition.

54. A loud speaker assembly as set forth in claim 53, in which said thioamido composition is selected from the group consisting of thiourea, trimethyl thiourea, tetramethyl thiourea, dibutyl thiourea, dilauryl thiourea, acetyl thiourea, ethylene thiourea, diphenyl thiourea, trimethyl thiourea, ditolyl thiourea and mercaptobenzimidazole.

55. A loud speaker assembly as set forth in claim 47, in which said decomposition promoting composition includes a metallic soap.

56. A loud speaker assembly as set forth in claim 55, in which said metallic soap is selected from the group consisting of cobalt naphthenate, manganese naphthenate and iron oleate.

57. A loud speaker assembly as set forth in claim 47, in which said decomposition promoting composition includes an organic metal complex.

58. A loud speaker assembly as set forth in claim 57, in which said organic metal complex is selected from the group consisting of cobalt acetylacetone complex and dipyridyl-iron complex.

59. A loud speaker assembly as set forth in claim 47, in which said decomposition promoting composition includes a reduction type organic composition.

60. A loud speaker assembly as set forth in claim 59, in which said reduction type organic composition is selected from the group consisting of L-ascorbic acid, D-iso-ascorbic acid and gallic acid.

61. A loud speaker assembly as set forth in claim 47, in which said decomposition promoting composition includes a triazine thiol.

62. A loud speaker assembly as set forth in claim 61, in which said triazine thiol is selected from the group consisting of triazine-trithiol and dibutylaminotriazine thiol.

63. A loud speaker assembly as set forth in claim 1, in which said organic peroxide is applied to at least one of said members in the form of a solution containing a chemical composition selected from the group consisting of acetone, methyl ethyl ketone, methyl isobutyl ketone, ethyl acetate, butyl acetate, benzene, toluene, ethyl alcohol, propyl alcohol, chloroform, dioctyl phthalate and dibutyl phthalate.

64. A loud speaker assembly as set forth in claim 1, in which said adhesive compound further comprises a polymerization inhibiting composition.

65. A loud speaker assembly as set forth in claim 64, in which said polymerization inhibiting composition is contained in said adhesive compound in a proportion less than 2 percent by weight to the total quantity of the adhesive compound.

66. A loud speaker assembly as set forth in claim 64, in which said polymerization inhibiting composition is selected from the group consisting of hydroquinone, methylhydroquinone, hydroquinonemonomethyl ether, p-benzoquinone, toluquinone, xxyloquinone, catechol, tert-butylcatechol, 2-tert-butyl-p-xydroxyanisole, 2,6-di-tert-butyl-p-cresole, picric acid, phenothiadine, hydroxydiphenylamine, diphenylpicrylhydrazyl and galvinoxyl.

67. A loud speaker assembly as set forth in claim 1, in which said adhesive compound further comprises an unsaturated alkyd resin.

68. A loud speaker assembly as set forth in claim 67, in which said unsaturated alkyd resin is contained in said adhesive compound in a proportion within the range of from 1 percent by weight to 20 percent by weight to the total quantity of the adhesive compound.

69. A loud speaker assembly as set forth in claim 67, in which said unsaturated alkyd resin is a product of polycondensation reaction between an unsaturated dibasic acid and a glycol.

* * * * *